United States Patent
Diab et al.

(10) Patent No.: US 8,565,105 B2
(45) Date of Patent: *Oct. 22, 2013

(54) METHOD AND SYSTEM FOR ETHERNET SWITCHING, CONVERSION, AND PHY OPTIMIZATION BASED ON LINK LENGTH IN AUDIO/VIDEO SYSTEMS

(75) Inventors: Wael William Diab, San Francisco, CA (US); Scott Powell, Aliso Viejo, CA (US); Michael Johas Teener, Santa Cruz, CA (US); Kevin Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,496

(22) Filed: Jun. 30, 2009

(65) Prior Publication Data
US 2010/0080111 A1    Apr. 1, 2010

Related U.S. Application Data

(60) Provisional application No. 61/101,072, filed on Sep. 29, 2008.

(51) Int. Cl.
*H04J 3/14* (2006.01)

(52) U.S. Cl.
USPC ........... 370/252; 370/287; 370/290; 370/465; 725/127

(58) Field of Classification Search
None
See application file for complete search history.

(56) References Cited

U.S. PATENT DOCUMENTS

| | | | | |
|---|---|---|---|---|
| 5,119,365 | A * | 6/1992 | Warner et al. | 370/282 |
| 5,633,863 | A * | 5/1997 | Gysel et al. | 370/290 |
| 5,805,202 | A * | 9/1998 | Mullins et al. | 725/127 |
| 6,184,919 | B1 * | 2/2001 | Asprey et al. | 725/148 |
| 6,963,561 | B1 * | 11/2005 | Lahat | 370/401 |
| 7,050,517 | B1 | 5/2006 | Sallaway et al. | |
| 7,308,058 | B2 | 12/2007 | Zerbe et al. | |
| 7,738,387 | B2 * | 6/2010 | Diab et al. | 370/246 |
| 7,826,436 | B2 * | 11/2010 | Niu et al. | 370/389 |
| 2004/0090927 | A1 * | 5/2004 | Zimmerman et al. | 370/268 |
| 2007/0121663 | A1 * | 5/2007 | Yousefi et al. | 370/446 |
| 2007/0153815 | A1 * | 7/2007 | She et al. | 370/401 |
| 2007/0248024 | A1 | 10/2007 | Conway et al. | |
| 2008/0056284 | A1 | 3/2008 | Powell et al. | |
| 2008/0069014 | A1 | 3/2008 | Powell et al. | |
| 2008/0069144 | A1 | 3/2008 | Yu et al. | |
| 2008/0232397 | A1 * | 9/2008 | Muth | 370/465 |
| 2009/0180529 | A1 | 7/2009 | Agazzi et al. | |
| 2010/0118870 | A1 * | 5/2010 | Defrance et al. | 370/389 |
| 2010/0214946 | A1 * | 8/2010 | Diab et al. | 370/252 |

* cited by examiner

*Primary Examiner* — Jeffrey M Rutkowski
(74) *Attorney, Agent, or Firm* — Farjami & Farjami LLP

(57) ABSTRACT

Aspects of a method and system for Ethernet Switching, Conversion, and PHY optimization based on link length in Audio/Video Systems are provided. In this regard, the length of a link over which a first communication device communicates with a second communication device may be determined and Ethernet PHY's residing in the communication devices may be configured based on the determination. One or both of the communication devices may comprise an Ethernet switch operable to switch packetized audio and/or video content. The packetized audio and/or video may be switched between the configured Ethernet PHY and one or more other Ethernet PHYs. Audio and/or video data may be received via the one or more corresponding Ethernet PHYs, the received audio and/or video data may be reformatted to be compatible with an audio and/or video interface, and the reformatted audio and/or video data may be transmitted via the audio and/or video interface.

30 Claims, 6 Drawing Sheets

METHOD AND SYSTEM FOR ETHERNET SWITCHING, CONVERSION, AND PHY OPTIMIZATION BASED ON LINK LENGTH IN AUDIO/VIDEO SYSTEMS

CROSS-REFERENCE TO RELATED APPLICATIONS/INCORPORATION BY REFERENCE

This patent application makes reference to, claims priority to and claims benefit from U.S. Provisional Patent Application Ser. No. 61/101,072 filed on Sep. 29, 2008.

This application also makes reference to:
U.S. patent application Ser. No. 12/490,209 filed on Jun. 23, 2009;
U.S. patent application Ser. No. 11/473,205 filed on Jun. 22, 2006; and
U.S. patent application Ser. No. 11/470,515 filed on Sep. 6, 2006.

Each of the above stated applications is hereby incorporated herein by reference in its entirety.

FIELD OF THE INVENTION

Certain embodiments of the invention relate to networking. More specifically, certain embodiments of the invention relate to a method and system for Ethernet Switching, Conversion, and PHY optimization based on link length in Audio/Video Systems.

BACKGROUND OF THE INVENTION

The multimedia consumer electronics market is rapidly evolving with increasingly sophisticated audio/video products. Consumers are becoming accustomed to high definition video in their home entertainment centers as well as high end graphic capabilities on personal computers. Several audio/video interface standards have been developed to link a digital audio/video source, such as a set-top box, DVD player, audio/video receiver, digital camera, game console or personal computer with an audio/video rendering device such as a digital television, a high definition video display panel or computer monitor. Examples of digital video interface technology available for consumer electronics comprise High-Definition Multimedia Interface (HDMI), Display Port, Digital Video Interface (DVI) and Unified Display Interface (UDI) for example. These audio/video interfaces may each comprise unique physical interfaces and communication protocols. Although each of these standards and/or interfaces have advantages and disadvantages, the multitude of standards and physical interfaces for conveying high bandwidth multimedia content adds to the complexity and cost of multimedia systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Ethernet Switching, Conversion, and PHY optimization based on link length in Audio/Video Systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Ethernet Switching, Conversion, PHY optimization based on link length in Audio/Video Systems. In various embodiments of the invention, the length of a link over which a first communication device communicates with a second communication device may be determined and Ethernet PHY's residing in the communication devices may be configured based on the determination. The Ethernet PHYs may be configured during manufacture, during installation, and/or during operation. An echo cancellation module and/or crosstalk cancellation module of the Ethernet PHYs may be configured. Gain and/or output levels of a transmit amplifier of the Ethernet PHYs may be configured. A number of iterations performed by a LDPC decoder of the Ethernet PHYs may be configured. A resolution, linearity, and/or power level of an analog-to-digital converter of the Ethernet PHYs may be configured. A feed forward equalizer of the Ethernet PHYs may be configured. Any of the communication devices may comprise a plurality of Ethernet PHYs and an Ethernet switch operable to switch packetized audio and/or video content between the plurality of Ethernet PHYs. The plurality of PHYs in a communication device may be operable to communicate over copper wiring, optical fiber, backplane, or a combination thereof links. Also, each of the plurality of Ethernet PHYs may be configured based on a length of a link over which it communicates.

Audio and/or video data may be received via the one or more corresponding Ethernet PHYs. The received audio and/or video data may be reformatted to be compatible with an audio and/or video interface, and the reformatted audio and/or video data may be transmitted via the audio and/or video interface. Audio and/or video data may also (or alternatively) be received via an audio and/or video interface. The received audio and/or video may be reformatted for transmission via the one or more corresponding Ethernet PHYs, and the reformatted audio and/or video data may be transmitted via the one or more corresponding Ethernet PHYs.

Figure 1:
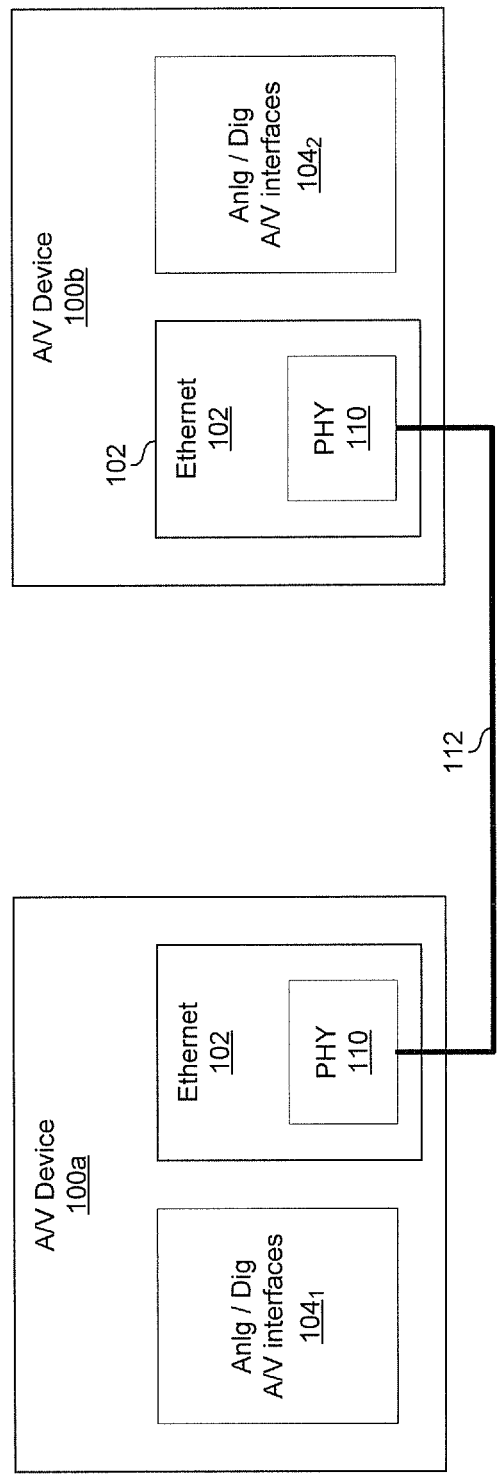
FIG. 1 is a diagram illustrating communication devices communicatively coupled via a short Ethernet link, in accordance with an embodiment of the invention.

FIG. 1 is a diagram illustrating audio communication devices communicatively coupled via a short Ethernet link, in accordance with an embodiment of the invention. Referring to FIG. 1, there is shown communication devices 100a and 100b, referenced collectively or individually as communication device(s) 100. Each of the communication devices 100 comprises one or more analog and/or digital A/V interfaces 104 and an Ethernet interface 102, the latter of which comprises a PHY 110. The communication devices 100 are communicatively coupled via an Ethernet link 112.

Each of the communication devices 100 may comprise, for example, a microphone, an instrument, a sound board, a sound card, a video camera, a media player, a graphics card; a personal computer, a laptop, a server, a handheld device, a switch, a router, or some combination thereof.

The A/V interfaces 104 may comprise one or more of, for example, an HDMI interface, a DVI interface, DisplayPort (DP) interface, a D-sub VGA interface, a composite video interface, a component video interface, and a S-video interface. In this regard, the A/V interfaces 104 may comprise analog and/or digital interfaces each of which may be associated with specific connectors and/or cabling.

The Ethernet interface 102 may comprise suitable logic, circuitry, interfaces, and/or code that may be operable to transmit and/or receive information via the Ethernet link 112. In this regard, the interface may implement the necessary layers of the OSI model for communicating multimedia information between the communication devices 100 over the Ethernet link 112. The Ethernet interface 102 may be enabled to utilize Audio/Video Bridging and/or Audio/video bridging extensions (collectively referred to herein as audio video bridging or AVB) for the exchange of multimedia content and associated control and/or auxiliary data. Also, the Ethernet interface 102 may be operable to implement security protocols such IPsec and/or MACSec. Also, the Ethernet interface 102 may support power over Ethernet (PoE) and/or power over Ethernet plus (PoEP). For example, the communication device 100a may supply power to the communication device 100b via the link 114.

Each of the PHYs 110 may comprise suitable logic, circuitry, and/or code that may be operable to convert digital information received from higher OSI layers into physical signals for communication over the link 112, and to convert physical signals received via the link 112 into digital information for communication to higher OSI layers. Each of the PHYs 110 may be operable to communicate at one or more data rates which may comprise standard, or potentially standardized, data rates such as 10 Mbps, 100 Mbps, 1 Gbps, 10 Gbps, and 40 Gbps or non-standard data rates such as 2.5 Gbps and 5 Gbps.

Each of the Phys 110 may be operable to communicate over copper twisted pair in accordance with standards such as 10BASE-T, 100GBASE-TX, 1GBASE-T, and/or 10GBASE-T, over backplane in accordance with standards such as 10GBASE-KX4 and/or 10GBASE-KR, over optical fiber such as a passive optical network (PON), over a multi-lane media in accordance with standards such as CR4, ER4, KR4, CR10 and SR10, or over a serial channel in accordance with standards such as KX, KR, SR, LR, LRM, SX, LX, CX, BX10, LX10. Accordingly, the link 112 is not limited to any specific medium or number of channels. The link 112 may, accordingly, comprise copper cabling, optical fiber, backplane, and/or some combination thereof.

Also, the PHYs 110 may support transmission and/or reception at a high(er) data in one direction and transmission and/or reception at a low(er) data rate in the other direction. For example, the communication device 100a may comprise a multimedia server and the communication device 100b may comprise a multimedia client. In this regard, the communication device 100a may transmit multimedia data to the communication device 100b at high(er) data rates while the communication device 100b may transmit control or auxiliary data associated with the multimedia content at low(er) data rates.

Each of the PHYs 110 may be operable to implement one or more energy efficient techniques, which may be referred to as energy efficient Ethernet (EEE). For example, the PHYs 110 may be operable to support low power idle (LPI) and/or sub-rating, also referred to as subset PHY, techniques. LPI may generally refer a family of techniques where, instead of transmitting conventional IDLE symbols during periods of inactivity, the PHYs 110 may remain silent and/or communicate signals other than conventional IDLE symbols. Sub-rating, or sub-set PHY, may generally refer to a family of techniques where the PHYs are reconfigurable, in real-time or near real-time, to communicate at different data rates.

In various embodiments of the invention, the PHY 110 may be optimized for communication over relatively short links. In this regard, because the PHYs 110 communicate over a short, isolated link 112, the noise and crosstalk experienced at the PHYs 110 may be significantly less than noise and/or crosstalk that would be experienced in a typical networking environment where Ethernet links run long distances and/or in close proximity with other links. Consequently, many operating and/or design constraints of the PHYs 110 may be relaxed as compared to conventional Ethernet PHYs intended for installation in noisy environments such as office buildings or computing centers. Accordingly, in some embodiments of the invention, the PHYs 110 may be designed and/or built with, for example, looser tolerances, less expensive components, and/or without components that may be found in standards-based PHYs. In other embodiments of the invention, the PHYs 110 may be dynamically configured during operation, and/or configured during installation and/or during manufacturing, based on the environment in which the PHY operates, is being installed, and/or based on the expected use of the PHY 110 after installation, respectively.

In operation, the PHYs 110 may be designed for short distance and/or low noise applications and use of the Ethernet interfaces 102 may be limited to communicating over links of, for example, 15 meters or less. In this regard, 15 meters is likely sufficient for most multimedia networks such as may be found in a home theater, for example. By limiting the distance over which the PHYs 110 are required to communicate, the PHYs 110 may be less complex in design, thus reducing the cost to implement the Ethernet interface 102, and may consume less energy, thus reducing the costs of ownership and operation of the communication devices 100.

In some embodiments of the invention, an Ethernet PHY may be optimized for communication over a short link but may be operable to communicate over a longer link by reducing its data rate to a lower data rate. For example, an Ethernet PHY may be configured for communicated at 10 Gbps over a short link but may be operable to communicate in accordance with, for example, 1GBASE-T standards over a longer Ethernet link.

In communicating the audio and/or video data, AVB may be utilized for reserving resources in the communication devices 100 and/or on the link 112. For example, multiple multimedia streams may be communicated between the communication devices 100 over the link 112, and AVB may be utilized to prioritize the streams.

Figure 2:
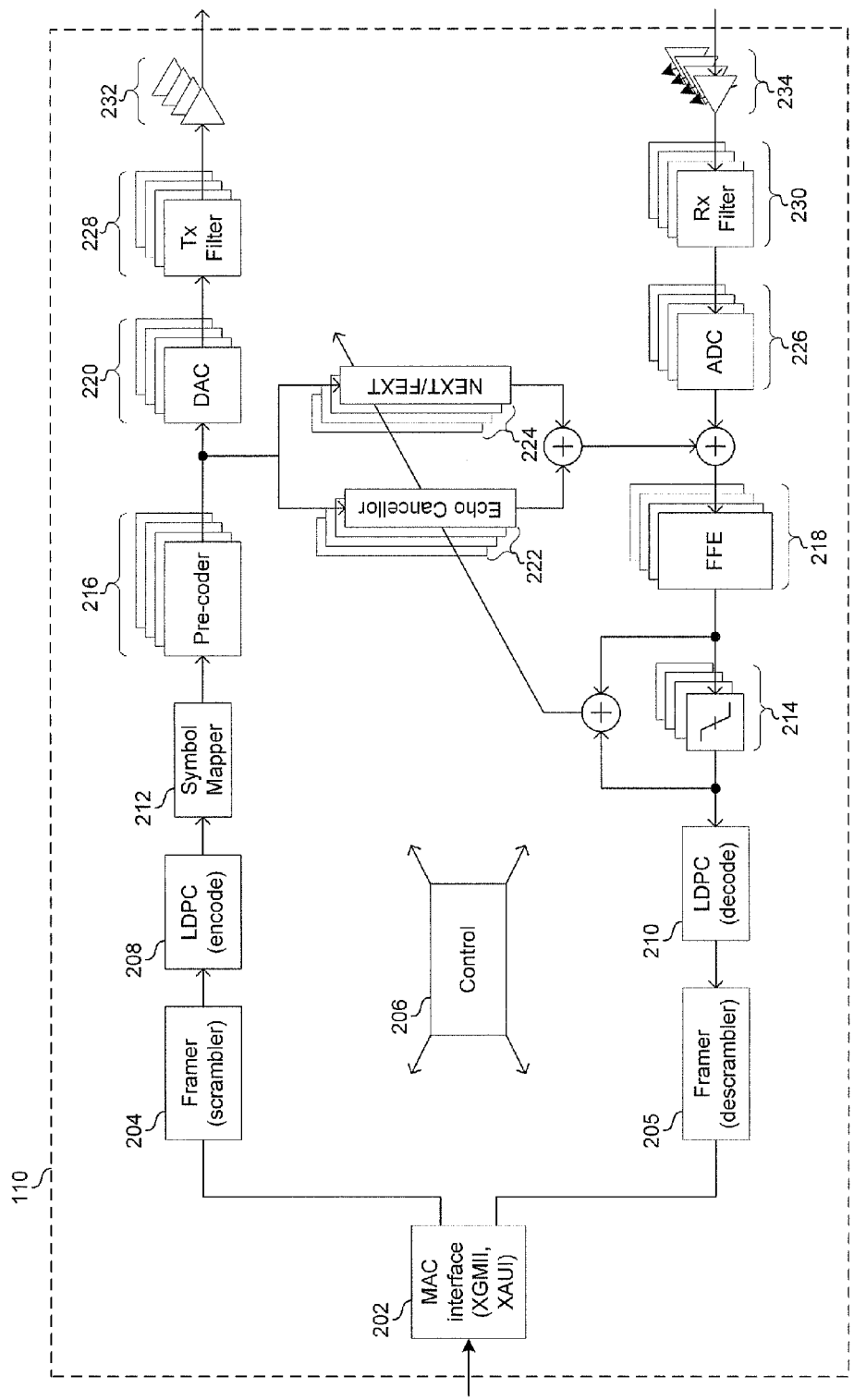
FIG. 2 is a block diagram illustrating details of an exemplary Ethernet PHY configurable for short distance communications, in accordance with an embodiment of the invention.

FIG. 2 is a block diagram illustrating details of an exemplary Ethernet PHY configurable for short distance communications, in accordance with an embodiment of the invention. Referring to FIG. 2, the Ethernet PHY 110 may be similar to a standards-compliant PHY, but various modules and/or functions of a standards-compliant Ethernet PHY may be configurable in the Ethernet PHY 110. In this regard, standards may be defined in the IEEE 802.3 family of standards.

In an exemplary embodiment of the invention, the PHY 110 may be based on the 10GBASE-T standard and may comprise a MAC interface module 202, framing module 202, a control module 206, a low density parity check (LDPC) encoding module 208, a LDPC decoding module 210, a level detection and/or restoration module 214, a preceding module 216, a feed forward equalization module 218, an echo cancellation module 222, a crosstalk cancellation module 224, digital to analog converter (DAC) 220, an analog to digital converter (ADC) 226, transmit filter 228, a receive filter 230, transmit amplifier 232, and receive amplifier 234. The various components and/or modules of the PHY 110 may be realized as dedicated hardware (e.g., an application specific integrated circuit (ASIC), as functions performed by a processor, as modules realized in a programmable device (e.g., FPGA), or a combination thereof.

The MAC interface module 202 may comprise suitable logic, circuitry, interfaces, and/or code that may be operable to communicate information between the PHY 110 and a media access controller and/or other higher OSI layer modules and/or functions.

The framing module 204 may comprise suitable logic, circuitry, interfaces, and/or code that may be operable to adapt a signal of a first bit-width from the MAC interface 202 with a signal of a second bit-width input to the LDPC encoder 208.

The framing module 205 may comprise suitable logic, circuitry, interfaces, and/or code that may be operable to adapt a signal of a first bit-width from the LDPC decoder 210 with a signal of a second bit-width input to MAC interface 202.

The control module 206 may comprise suitable logic, circuitry, interfaces, and/or code for managing operations of the various functions and/or modules of the PHY 110. In some embodiments of the invention, the control module may be operable to detect whether the PHY 110 is to communicate over a standard Ethernet link or a short Ethernet link and may configure various portions of the PHY 110 accordingly.

The low density parity check (LDPC) encoder 208 may comprise suitable logic, circuitry, interfaces and/or code that may be operable to modify blocks of data to enable a receiver to detect errors that may have been introduced during transmission and/or reception.

The LDPC decoder 210 may comprise suitable logic, circuitry, interfaces, and/or code that may be operable to process received data that has been encoded utilizing LDPC to detect errors in received data and correct the errors if possible. In various embodiments of the invention, the LDPC decoder 210 may decode received data in fewer iterations than a comparable LDPC decoder instantiated in a 10GBASE-T PHY. In some embodiments of the invention, the LDPC decoder 210 may be configurable and may be configured during manufacture, during installation, and/or during operation. For example, the number of iterations for decoding received data may be configured. Additionally or alternatively, the LDPC decoder 210 may be enabled and disabled via a control signal. In this manner, the PHY 110 may be configured for short range operation or for standards compliant operation.

The level detection and/or restoration module 214 may comprise suitable logic, circuitry, interfaces, and/or code that may be operable to determine levels of the signal output from the FFE 218 and/or to restore the levels to one or more predefined levels.

The preceding module 216 may comprise suitable logic, circuitry, interfaces, and/or code that may be operable to manipulate and/or modify signals in anticipation of interference that will occur either in the remainder of the transmit path of the Ethernet PHY 110 and/or in the channel over which the signal is transmitted. In this regard, the manipulation and/or modification of the signal may pre-cancel the effects of the anticipated interference. In an exemplary embodiment of the invention, the preceding module may implement Tomlinson-Harashima preceding.

The feed forward equalization (FFE) module 218 may comprise suitable logic, circuitry, interfaces and/or code that may enable removal of precursor inter-symbol interference (ISI) to make the channel minimum-phase and to whiten the noise in the channel. In various embodiments of the invention, the feed forward equalizer 218 may be of reduced complexity as compared to a feed forward equalizer that may be utilized in a 10GBASE-T PHY. In some embodiments of the invention, the forward equalizer 218 may be configurable and may be configured during manufacture, during installation, and/or during operation. For example, coefficients and/or resolution of the equalizer may be configured. Additionally or alternatively, the FFE 218 may be enabled and disabled via a control signal. In this manner, the PHY 110 may be configured for short range operation or for standards compliant operation.

The echo cancellation module 222 may comprise suitable logic, circuitry, interfaces and/or code that may enable canceling at least a portion of the ECHO component received in the twisted-pair wire from the local transmitter on the same twisted-pair wire.

The crosstalk cancellation module 224 may comprise suitable logic, circuitry, interfaces and/or code that may enable canceling at least a portion of the near-end crosstalk (NEXT) component received in the twisted-pair wire from the local transmitters corresponding to the three adjacent twisted-pair wires and a far-end crosstalk (FEXT) component received in the twisted pair wire from the remote transmitters corresponding to the three adjacent twisted-pair wires.

In some embodiments of the invention, one or both of the echo cancellation module 222 and/or the crosstalk (far-end and/or Near-end) cancellation module 224 may be configured for simplified operation as compared to a 10GBASE-T PHY, or in some instances, may be disabled. In some embodiments of the invention, the PHY 110 may be described by a hardware description language (HDL) and one or more portions of the HDL design file corresponding to the echo cancellation module 222 and/or the crosstalk cancellation module 224 may not be synthesized for instances of the PHY 110 intended for use in short reach applications. In some embodiments of the invention, one or both of the echo cancellation module 222 and/or the crosstalk cancellation module 224 may be configurable and may be configured during manufacture, during installation, and/or during operation. In this manner, the PHY 110 may be configured for short range operation or for standards-compliant operation.

The digital-to-analog converter (DAC) 220 may comprise suitable logic, circuitry, interfaces, and/or code that may be operable to convert digital signals to an analog current and/or voltage. In various embodiments of the invention, the range, resolution, linearity, and/or other characteristics of the ADC 226 may be variable and may be configured by, for example, one or more signals from the control module 206.

The analog-to-digital converter (ADC) 226 may comprise suitable logic, circuitry, interfaces, and/or code that may be operable to convert analog voltages and/or currents to a digital representation. The range, resolution, linearity, and/or other characteristics of the ADC 226 may be variable and may be configured by, for example, one or more signals from the control module 206. In various embodiments of the invention, the ADC 226 may be lower resolution, lower power, and/or less linear than a corresponding ADC in a standards based 10GBASE-T PHY. In some embodiments of the invention, the ADC 226 may be configurable and may be configured during manufacture, during installation, and/or during operation. For example, resolution, linearity, and/or power consumption of the ADC 226 may be configured. Additionally or alternatively, the ADC 226 may be enabled and disabled via a control signal. In this manner, the PHY 110 may be configured for short range operation, or for standards compliant operation.

The transmit filter 228 may comprise suitable logic, circuitry, interfaces, and/or code that may be operable to apply various levels of attenuation to various frequency bands. In this regard, the transmit filter 228 may be operable to filter out interference or noise from transmitted signals.

The receive filter 230 may comprise suitable logic, circuitry, interfaces, and/or code that may be operable to apply various levels of attenuation to various frequency bands. In this regard, the receive filter 230 may be operable to filter out interference or noise from a received signals.

The transmit amplifier 232 may comprise suitable logic, circuitry, interfaces, and/or code that may be operable to increase the signal strength of signals to be transmitted. The gain of the transmit amplifier 232 may be variable and may be controlled by, for example, one or more signals from the control module 206. In various embodiments of the invention, the gain and/or output levels of the transmit amplifier 232 may be configured to transmit at a reduced power level as compared to the levels that would be needed to meet the applicable standard, 10GBASE-T, for example. In some embodiments of the invention, the transmit power of the transmit amplifier 232 may be configurable and may be configured during manufacture, during installation, and/or during operation. Additionally or alternatively, the transmit amplifier 232 may be enabled and disabled via a control signal. In this manner, the PHY 110 may be configured for short range operation or for standards compliant operation.

The receive amplifier 234 may comprise suitable logic, circuitry, interfaces, and/or code that may be operable to increase the signal strength of signals to be transmitted. The gain of the receive amplifier 234 may be variable and may be controlled by, for example, one or more signals from the control module 206.

Although 10GBASE-T is utilized for illustration, the invention is not so limited. Accordingly, other standard and/or non-standard PHYs may be utilized without departing from the spirit and scope of the various embodiments of the invention.

Figure 3A:
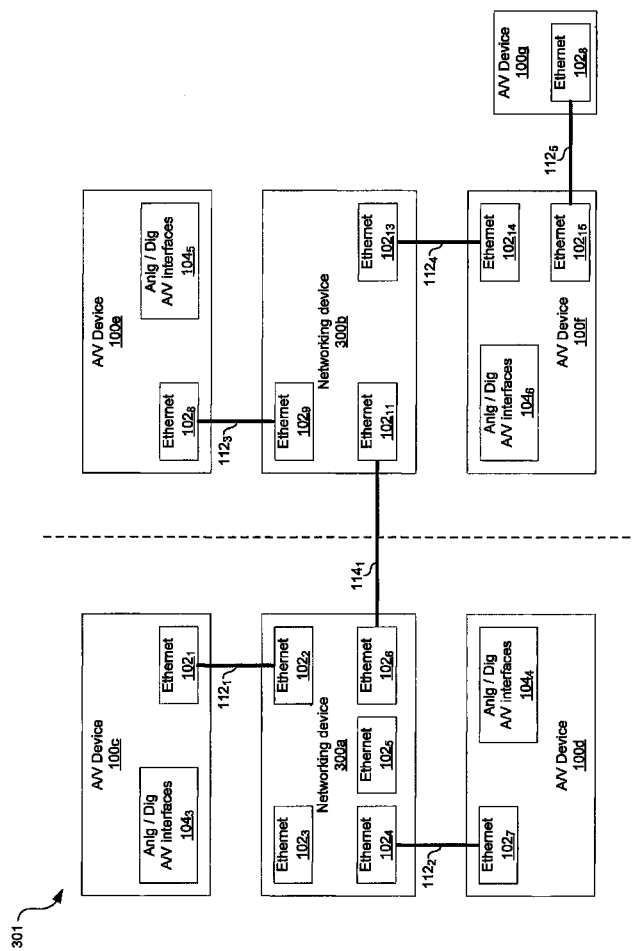
FIG. 3A is a diagram illustrating an Ethernet based audio and/or video network, in accordance with an embodiment of the invention.

FIG. 3A is a diagram illustrating an Ethernet based A/V network, in accordance with an embodiment of the invention. Referring to FIG. 3A, there is shown a network 301 comprising communication devices 100c-100g, referenced individually or collectively as communication devices 100, communication devices 300a and 300b, and Ethernet links 112. Each of the communication devices 100c-100f comprises one or more A/V interfaces 104. Each of the communication devices 100 and the communication devices 300 comprises one or more Ethernet interface 102. Various devices of FIG. 3A are communicatively coupled via Ethernet links 112 and 114.

The communication devices 100 may as described with respect to FIG. 1. The communication devices 300a and 300b, may be similar to or the same as the communication devices 100, however, they are referenced as communication devices 300 to clarify their role in the network 301. In this regard, the communication devices 300 may comprise switches, routers, bridges, or other multi-port network elements operable to forward traffic between the ports. The exemplary communication devices 300a and 300b comprise 5 and 3 Ethernet interfaces respectively; however, a communication device may comprise any number of interfaces without deviating from the scope of the invention.

The A/V interfaces 104 may be as described with respect to FIG. 1. In this regard, the A/V interfaces 104 may comprise, for example, one or more of HDMI, DVI, VGA, composite video, component video, S-video, stereo audio, or digital audio interfaces.

Each the Ethernet interfaces 102 may be as described with respect to FIG. 1. In this regard, each of the Ethernet interfaces 102 may be operable to communicate over copper wiring, optical fiber, or backplane; and a single network device 100 or 300 may comprise a variety of interfaces to communicate over a variety of media. With regard to copper, aspects of the invention that enable communicating over a short link may also enable communicating over lower quality copper cabling such as category 1 through category 5 twisted pair cabling. In various embodiments of the invention, some of the Ethernet interfaces 102 may be configured to communicate over short distances and/or low(er) grade copper and others may be configured for standards-compliant communication. The Ethernet links 112 may comprise short Ethernet links that span, for example, less than 15 meters, and the Ethernet links 114 may comprise a longer link up to the maximum length defined in the standard. In this regard, one or more communication devices 100 and/or 300 may be in a first location, such as a media room, and one or more communication devices 100 or 300 may be in a second location, such as a living room. Also, the Ethernet interface 102 may support PoE and/or PoEP. For example, the communication devices 300a and 300b may supply power to the communication devices 100c-100f via the links 114.

In operation, in an exemplary embodiment of the invention, the communication device 100c may comprise a media source, such as a hard drive or DVD player, and the communication devices 100d-100g may comprise televisions and/or speakers. In such an embodiment, the communication device 100c may output audio and/or video to the communication devices 100d-100f and the communication device 100f may forward, or pass through, the audio and/or video to the communication device 100g. In an exemplary embodiment of the invention, the Ethernet interfaces may be configured based on a type, resolution, sampling rate, and/or other properties of audio and/or video communicated. For example, Ethernet interfaces 102 which communicate via copper cabling and carry only audio content may be configured to communicate over two twisted pairs and/or at a lower data rate. In this regard, in some instances a right stereo channel may be communicated via a first twisted pair and a left stereo channel may be communicated via a second twisted pair. Conversely, Ethernet interfaces 102 that communicate video or combined audio and video may be configured to communicate at higher rates and over four twisted pairs.

The communication device 100c may convey the audio and/or video to the communication device 300a via the link 112$_1$. In this regard, the communication device 100c may be near the communication device 300a and the Ethernet interfaces 102$_1$ and 102$_2$ may be configured for short range communications. Subsequently, the communication device 300a may forward the audio and/or video to communication device 100d via the link $112_2$ and to the communication device 300b via the link 114. In this regard, the communication device 100d may be near the communication device 300a and the Ethernet interfaces $102_4$ and $102_7$ may be configured for short range operation. Conversely, the communication device 300b may be relatively far from the communication device 300a—in a different room, for example. Accordingly, the Ethernet interfaces $102_6$ and $102_{11}$ may be configured for communication in accordance with the applicable standard, such as 10GBASE-T. Alternatively, the Ethernet interfaces $102_6$ and $102_{11}$ may, for example, comprise optical PHYs and the link $114_1$ may comprise an optical fiber.

In various embodiments of the invention, resources along the links 112 and 114, resources in the communication devices 100, and/or resources in the communication devices 300a and 300b may be reserved and may operate in accordance with AVB standards such as IEEE 802.1AS, IEEE 802.1Qat, and IEEE 802.1Qav.

In an exemplary embodiment of the invention, the communication device 100g may comprise, for example, a subwoofer or speaker which may be powered via PoE and receive audio via the Ethernet link $112_5$.

In various embodiments of the invention, MACSec and/or IPsec may be utilized to secure audio and/or video content communicated among various communication devices 100 and 300 in the network 301.

Figure 3B:
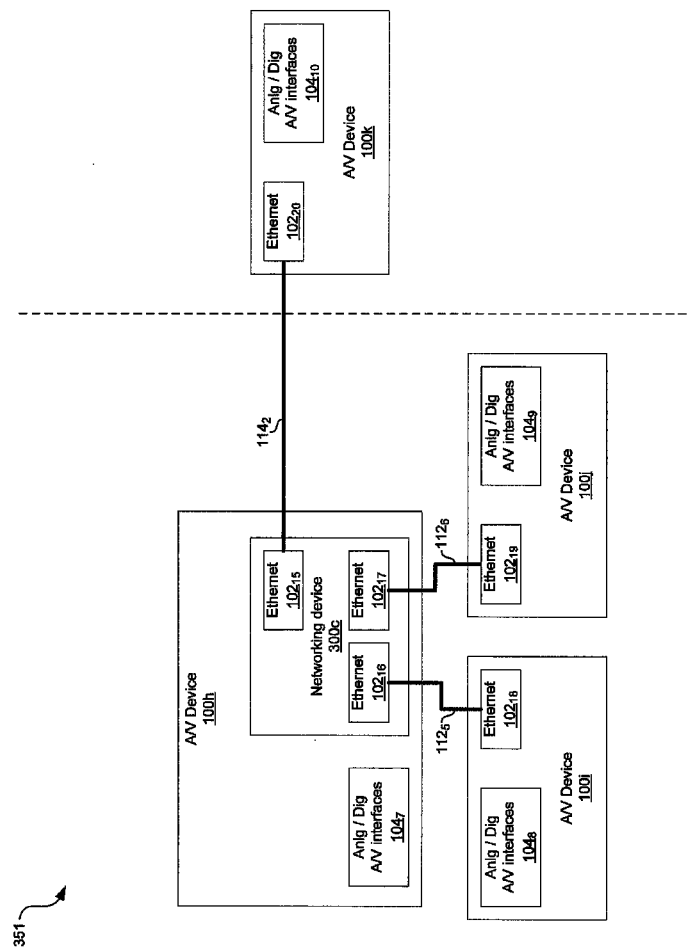
FIG. 3B is a diagram illustrating an Ethernet based audio and/or video network, in accordance with an embodiment of the invention.

FIG. 3B is a diagram illustrating an Ethernet based audio and/or video network, in accordance with an embodiment of the invention. Referring to FIG. 3B, there is shown an audio and/or video network 351 comprising communication devices 100h-100k, collectively or individually referenced as communication devices 100.

The network 351 may be similar to the network 301 described with respect to FIG. 3A, but may differ in that a communication device 300c, which may be a switch, is integrated within the communication device 100g. In this regard, the communication device 100g may be, for example, a television or set-top-box and may be operable to route audio and/or video to multiple devices via Ethernet interfaces $102_{15}$-$102_{17}$. In this manner, a separate communication device may not be necessary to network multiple communication devices 100 and enable the communication of audio and/or video to and/or from any of the communication devices 100.

In some embodiments of the invention, communications devices such as 300a and 300b of FIG. 3A may be communicatively coupled to, or within a same network as, devices such as 100h of FIG. 3B.

In various embodiments of the invention, MACSec and/or IPsec may be utilized to secure audio and/or video content communicated among various communication devices 100 and 300 in the network 351.

Figure 4:
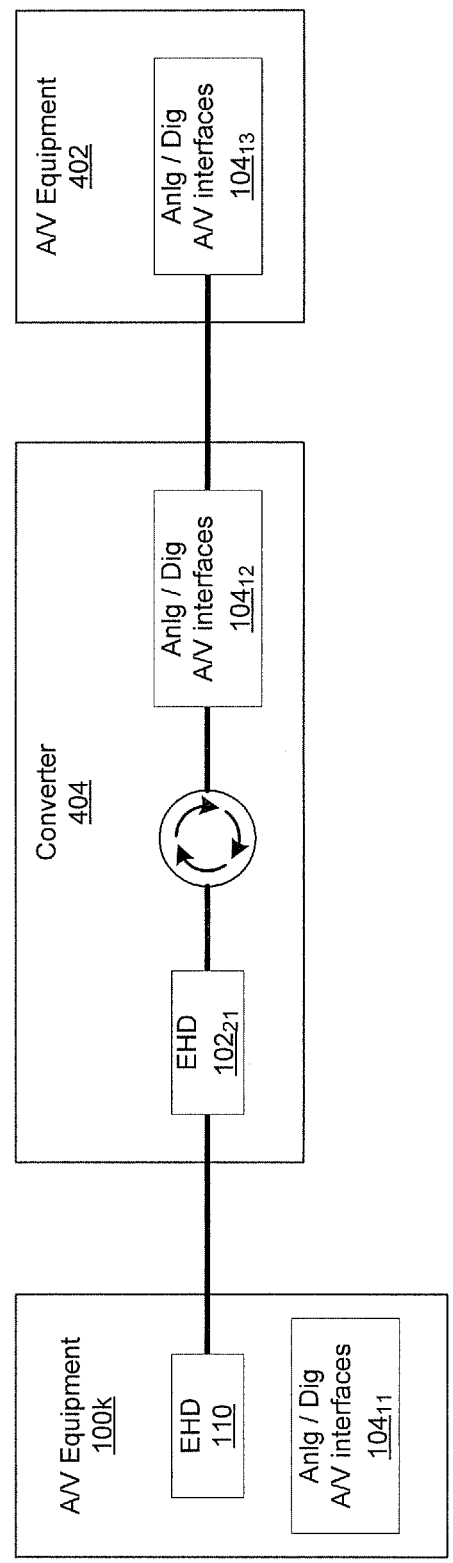
FIG. 4 is a diagram illustrating conversion of conventional audio and/or video interfaces to Ethernet, in accordance with an embodiment of the invention.

FIG. 4 is a diagram illustrating conversion of conventional audio and/or video interfaces to Ethernet, in accordance with an embodiment of the invention. Referring to FIG. 4 there is shown an communication device 100k, a converter 404, and an communication device 402.

The communication device 100k may be similar to or the same as the previously described communication devices 100. The communication device 402 may be a legacy device that does not comprise an Ethernet interface. In this regard, the communication device 100k may be operable to receive and/or transmit audio and/or video data via dedicated analog and/or digital interfaces such as HDMI, DVI, DisplayPort, component video, and/or composite video.

The converter 404 may comprise suitable logic, circuitry, interfaces, and/or code operable to convert or transcode between Ethernet packets comprising audio and/or video data and analog and/or digital A/V signals. In this regard, exemplary signal processing functions may comprise analog-to-digital conversion, digital-to-analog conversion, packetization, de-packetization, amplification, encryption, and decryption.

In operation, in an exemplary embodiment of the invention, audio and/or video data received via the Ethernet interface $102_{21}$ may be extracted from the payload of one or more Ethernet frames and a HDMI stream comprising the extracted audio and/or video may be generated and transmitted via one of more A/V interfaces $104_{12}$. Similarly, an HDMI audio and/or video stream received via the interface $104_{12}$ may be packetized into one or more Ethernet packets and transmitted via the interface $102_{21}$.

Figure 5:
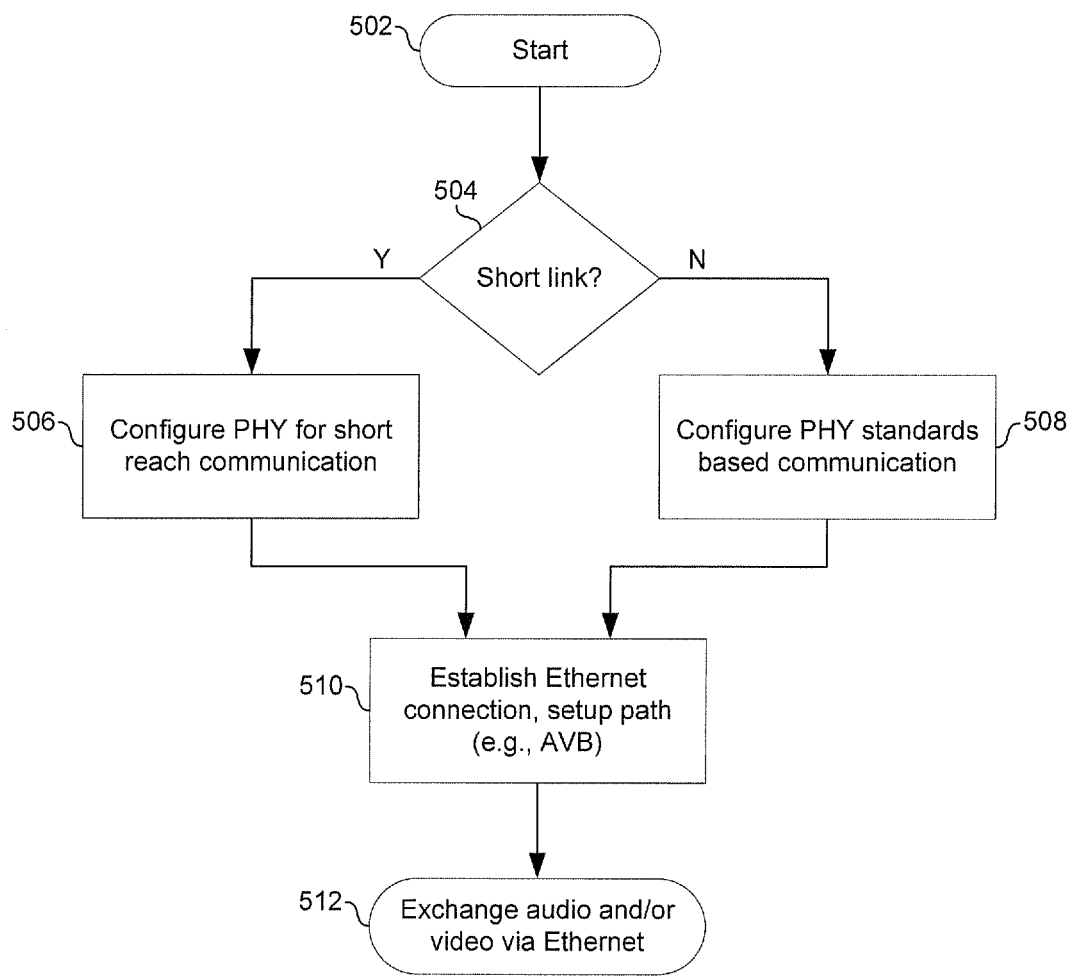
FIG. 5 is a flowchart illustrating exemplary steps for configuring an Ethernet PHY for short distance communications, in accordance with an embodiment of the invention.

FIG. 5 is a flowchart illustrating exemplary steps for configuring an Ethernet PHY for short distance communications, in accordance with an embodiment of the invention. Referring to FIG. 5, after start step 502, the exemplary steps may advance to step 504.

In step 504, it may be determined whether an Ethernet interface of a communication device 100 will communicate over a short link or will communicate over an Ethernet link that may be up to the maximum length defined by the applicable standards. For example, in some instances the communication device 100 may be installed in a home theater and there will be no need for the audio and/or video to be communicated farther than, for example, 15 meters. Conversely the communication device 100 may installed in a media closet and the Ethernet interface may be utilized to communicate the audio and/or video to another floor and/or room of the building. The determination of the link length may be made based on, for example, configuration by a network administrator, based on signals and/or conditions present in the communication device 100, and/or based on test signals communicated to and/or from a link partner. In instances that the Ethernet interface will communicate over a short link, the exemplary steps may advance to step 506.

In step 506, the Ethernet PHY 110 may be configured for communication of a short Ethernet link. As described with respect to FIG. 2, various components and/or functions of the Ethernet PHY 110 may be impacted by the configuration. In various embodiments of the invention, the configuration may be done automatically or manually, via hardware, software, or firmware, and may be done during manufacture, installation, and/or operation of the Ethernet PHY 110. In some instances, a PHY may be configured for communication over a short link but may subsequently be coupled to a longer link. In such instances, the PHY may be operable to reduce the rate at which it communicates such that acceptable bit error rates and/or other standards and/or non-standards based requirements may be met. Subsequent to step 506, the exemplary steps may advance to step 510.

In step 510, the Ethernet PHY 110 may establish communication with a Ethernet PHY in a link partner, which may be another communication device 100. Establishing communication may comprise, for example, training coefficients of the PHYs 110. In this regard, in instances that the Ethernet PHY 110 is configured for communication over a short link, time required for training may be reduced due, for example, echo and/or crosstalk cancellation being disabled or not instantiated. Establishing communication may additionally comprise reserving resources along the network path utilizing AVB. In this regard, resources may be reserved to provide the quality of service necessary for timely delivery of time-sensitive audio and/or video. Subsequent to step 510, the exemplary steps may advance to step 512.

In step 512, the communication devices may exchange audio and/or video via the Ethernet interfaces. In various embodiments of the invention, one or both of the communication devices may comprise a communication device such as a switch and may forward the audio and/or video to multiple communication devices.

Returning to step 504, in instances that the Ethernet PHY may communicate over an Ethernet link of up to the maximum length dictated by the appropriate standard, the exemplary steps may advance to step 508.

In step 508, the Ethernet PHY may be configured for standards based communication. For example, the Ethernet PHY 110 may be configured to adhere to the 10GBASE-T standard. In this regard, as described with respect to FIG. 2, various components and/or functions of the Ethernet PHY may be impacted by the configuration. In various embodiments of the invention, the configuration may be done automatically or manually, via hardware, software, or firmware, and may be done during manufacture, installation, and/or operation of the Ethernet Various aspects of a method and system for Ethernet Switching, Conversion, and PHY optimization based on link length in Audio/Video Systems. In an exemplary embodiment of the invention, the length of a link 112 or 114 over which two communication devices 100, 300, or 402 communicate may be determined and Ethernet PHY's 110 residing in one or more of the plurality of communication devices 100, 300, or 402 may be configured based on the determination. The Ethernet PHYs 110 may be configured during manufacture, during installation, and/or during operation. An echo cancellation module 222 and/or crosstalk cancellation module 224 of the Ethernet PHYs 110 may be configured. Gain and/or output levels of a transmit amplifier 232 of the Ethernet PHYs 110 may be configured. A number of iterations performed by a LDPC decoder 210 of the Ethernet PHYs 110 may be configured. A resolution, linearity, and/or power level of an analog-to-digital converter 226 of the Ethernet PHYs 110 may be configured. A feed forward equalizer 218 of the Ethernet PHYs 110 may be configured. An communication device 300 may comprise multiple Ethernet PHYs 110 and may be operable to switch packetized audio and/or video content between the plurality of Ethernet PHYs 110. The plurality of PHYs in a communication device 300 may be operable to communicate over copper wiring, optical fiber, backplane, or a combination thereof links. Also, each of the plurality of Ethernet PHYs 110 may be configured based on a length of a link 112 or 114 over which it communicates.

An communication device 404 may comprise audio and/or video processing devices. Audio and/or video data may be received via the one or more corresponding Ethernet PHYs 110, the received audio and/or video data may be reformatted to be compatible with an audio and/or video interface 104, the reformatted audio and/or video data may be transmitted via the audio and/or video interface 104. Audio and/or video data may be received via an audio and/or video interface 104, the received audio and/or video may be reformatted for transmission via the one or more corresponding Ethernet PHYs 110, and the reformatted audio and/or video data may be transmitted via the one or more corresponding Ethernet PHYs 110.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Ethernet Switching, Conversion, and PHY optimization based on link length in Audio/Video Systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   determining a length of an Ethernet link that communicatively couples a first Ethernet PHY of a first communication device to a first Ethernet PHY of a second communication device;
   disabling one or both of an echo cancellation module and a crosstalk cancellation module within said first Ethernet PHY of one or both of said first and second communication devices when said length of said Ethernet link is shorter than a predetermined length;
   reducing a range of an analog to digital converter within said first Ethernet PHY of one or both of said first and second communication devices when said length of said Ethernet link is shorter than said predetermined length;
   pre-cancelling interference anticipated to occur over said Ethernet link;
   configuring said Ethernet PHYs to communicate one or both of audio and video data over said Ethernet link based on a type, resolution, and/or sampling rate of said one or both of said audio and video data.

2. The method according to claim 1, wherein each of said Ethernet PHYs are configured during one or more of manufacture, installation and operation.

3. The method according to claim 1, comprising configuring one or both of an echo cancellation module and a crosstalk cancellation module of one or both of said Ethernet PHYs.

4. The method according to claim 1, comprising configuring one or both of gain and output levels of a transmit amplifier of one or both of said Ethernet PHYs.

5. The method according to claim 1, comprising configuring a number of iterations performed by a LDPC decoder of one or both of said Ethernet PHYs.

6. The method according to claim 1, comprising configuring one or more of a resolution, linearity, and power level of said analog to digital converter of one or both of said Ethernet PHYs.

7. The method according to claim 1, comprising configuring a feed forward equalizer of one or both of said Ethernet PHYs.

8. The method according to claim 1, wherein said first communication device comprises an Ethernet switch operable to switch packetized one or more of audio and video content between said first Ethernet PHY and one or more other PHYs integrated within said first communication device.

9. The method according to claim 8, wherein said one or more other PHYs are communicatively coupled to a corresponding one or more other communication devices via a corresponding one or more other Ethernet links, wherein said other Ethernet links comprise copper wiring, optical fiber, backplane, or a combination thereof.

10. The method according to claim 8, wherein one or more of said other PHYs are configured based on a length of an Ethernet link over which they communicate.

11. The method according to claim 1, comprising:
receiving one or both of audio and video data via said one or more corresponding Ethernet PHYs;
reformatting said one or both of audio and video data to be compatible with an interface supporting one or both of audio and video;
and transmitting said reformatted one or both of audio and video data via said interface.

12. The method according to claim 1, comprising:
receiving one or both of audio and video data via an interface supporting one or both of audio and video;
reformatting said one or both of audio and video data for transmission via said one or more corresponding Ethernet PHYs; and
transmitting said reformatted one or both of audio and video data via said one or more corresponding Ethernet PHYs.

13. The method according to claim 1, wherein said first Ethernet PHY of one or both of said first and second communication devices are described by a hardware description language (HDL).

14. The method according to claim 13, wherein said disabling one or both of said echo cancellation module and said crosstalk cancellation module comprises not synthesizing portions of an HDL design file corresponding to said one or both of said echo cancellation module and said crosstalk cancellation module.

15. The method according to claim 1, wherein said predetermined length is approximately 15 meters.

16. A system for communication, the system comprising:
one or more circuits for use in an Ethernet link partner, said one or more circuits configured to:
determine a length of an Ethernet communication link that communicatively couples a first Ethernet PHY of a first Ethernet device to a first Ethernet PHY of a second Ethernet device;
disable one or both of an echo cancellation module and a crosstalk cancellation module within said first Ethernet PHY of one or both of said first and second Ethernet devices when said length of said Ethernet link is shorter than a predetermined length;
reduce a range of an analog to digital converter within said first Ethernet PHY of one or both of said first and second communication devices when said length of said Ethernet link is shorter than said predetermined length;
pre-cancel interference anticipated to occur over said Ethernet link;
configure said Ethernet PHYs to communicate one or both of audio and video data over said Ethernet communication link based on said determined length of said Ethernet link and based on a type, resolution, and/or sampling rate of said one or both of said audio and video data.

17. The system according to claim 16, wherein each of said Ethernet PHYs are configured during one or more of manufacture, installation, and operation.

18. The system according to claim 16, wherein said one or more circuits are operable to configure one or both of an echo cancellation module and a crosstalk cancellation module of one or both of said Ethernet PHYs.

19. The system according to claim 16, wherein said one or more circuits are operable to configure one or both of gain and/or output levels of a transmit amplifier of one or both of said Ethernet PHYs.

20. The system according to claim 16, wherein said one or more circuits are operable to configure a number of iterations performed by a LDPC decoder of one or both of said Ethernet PHYs.

21. The system according to claim 16, wherein said one or more circuits are operable to configure one or more of a resolution, linearity, and power level of said analog to digital converter of one or both of said Ethernet PHYs.

22. The system according to claim 16, wherein said one or more circuits are operable to configure a feed forward equalizer of one or both of said Ethernet PHYs.

23. The system according to claim 16, wherein said first communication device comprises an Ethernet switch operable to switch packetized one or both of audio and video content between said first Ethernet PHY and one or more other PHYs integrated within said first communication device.

24. The system according to claim 23, wherein said one or more other PHYs are communicatively coupled to a corresponding one or more other communication devices via a corresponding one or more other Ethernet links, wherein said other Ethernet links comprise copper wiring, optical fiber, backplane, or a combination thereof.

25. The system according to claim 23, wherein one or more of said other PHYs are configured based on a length of an Ethernet link over which they communicate.

26. The system according to claim 16, wherein said one or more circuits are operable to:
receive one or both of audio and video data via said one or more corresponding Ethernet PHYs;
re-format said one or both of audio and video data to be compatible with an interface supporting one or both of audio and video;
and transmit said converted one or both of audio and video data via said interface.

27. The system according to claim 16, wherein said one or more circuits are operable to:
receive one or both of audio and video data via an interface supporting one or both of audio and video;
reformatted said one or both of audio and video data for transmission via said one or more corresponding Ethernet PHYs; and
transmit said reformatted one or both of audio and video data via said one or more corresponding Ethernet PHYs.

28. The system according to claim 16, wherein said first Ethernet PHY of one or both of said first and second Ethernet devices are described by a hardware description language (HDL).

29. The system according to claim 28, wherein said disabling one or both of said echo cancellation module and said crosstalk cancellation module comprises not synthesizing portions of an HDL design file corresponding to said one or both of said echo cancellation module and said crosstalk cancellation module.

30. The system according to claim 16, wherein said predetermined length is approximately 15 meters.

* * * * *